United States Patent Office 2,906,755
Patented Sept. 29, 1959

2,906,755
N-ACYL DERIVATIVES OF α-PYRIDINE CARBOXYLIC ACID HYDRAZIDE

Engelbert Kühle, Leverkusen-Bayerwerk, and Gerhard Domagk, Wuppertal-Elberfeld, Germany, assignors to Schenley Industries, Inc., New York, N.Y., a corporation of Delaware No Drawing. Application October 4, 1957
Serial No. 688,127

Claims priority, application Germany November 16, 1956

6 Claims. (Cl. 260—295)

The present invention relates, in general, to the synthesis of novel organic chemical compounds which are useful as pharmacological agents in the treatment of certain diseases of warm-blooded animals. More particularly, the invention contemplates the provision of novel N-acyl derivatives of α-pyridine carboxylic acid hydrazide which have been found to be extremely useful as antitubercular agents.

It has been established, heretofore, that isonicotinic acid hydrazide can be reacted with acyl halides or acyl anhydrides of dicarboxylic acids to form the isonicotinyl hydrazide of cyclic dicarboxylic acids, and that the isonicotinyl hydrazide of phthalic acid, for example, possesses strong tuberculostatic properties. It has also been postulated by prior investigators that these isonicotinic acid derivatives represent the probable ultimate in such chemotherapeutic activity, inasmuch as the hydrazine derivatives of α-pyridine carboxylic acid which have been tested heretofore are generally far less active tuberculostatically than those of isonicotinic acid.

The present invention is based, in part, on our discovery that the N-acyl derivatives of cyclic dicarboxylic acid hydrazides, obtained by reacting α-pyridine carboxylic acid hydrazide with select dicarboxylic acid anhydrides, and notably the phthalic hydrazide of α-pyridine carboxylic acid as represented by the formula:

(I) 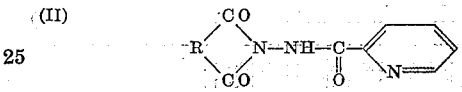

are highly efficacious tuberculostatic agents of enhanced general compatibility as compared, for example, with INH.

Thus, the principal objective in the chemotherapeutic treatment of tuberculosis is the elimination of the infecting bacteria, and depending upon the individual circumstances underlying the illness, this necessitates prolonged treatment which may extend over many months. Accordingly, an antitubercular agent must not only be highly effective against the infecting microorganism, but it must also possess particularly good compatibility when administered over prolonged periods. While INH is generally well tolerated, it does occasionally induce undesirable side effects with some patients, particularly those which are manifested with respect to the central and peripheral nervous system. On the other hand, it has been found that the foregoing typical compound of the invention possesses substantially the same chemotherapeutic activity as INH, but is substantially more compatible than INH as demonstrated by the comparative pharmacological data presented hereinafter.

We have found that, in general, the reactions between the dicarboxylic acid anhydrides and α-pyridine carboxylic acid hydrazide may be effected at temperatures within the range 50–100° C. in organic solvents such as dioxan, dimethylformamide and high-boiling point hydrocarbons. The reaction may be effected, also, within an aqueous phase, generally yielding the desired end-product. The compounds of the invention are substantially all crystalline products, some of which crystallize from solution with one-half mole or one mole of water of crystallization.

Among the dicarboxylic acid anhydrides that may be employed in the process of the invention are included, for example, those of phthalic acid; nuclear-substituted phthalic acids, particularly 4-chlorophthalic acid; 1,2-naphthalenedicarboxylic acid; tetrahydrophthalic acid; hexahydrophthalic acid; 2,3-pyridine dicarboxylic acid; 3,6-endomethylene-Δ⁴-tetrahydrophthalic acid (3,6-methylene-4-cyclohexene-1,2-dicarboxylic acid), etc. In addition, maleic anhydride and succinic anhydride may also be employed as starting materials in the production of compounds of the invention.

The compounds of the invention may be represented in general by the following formula:

(II) 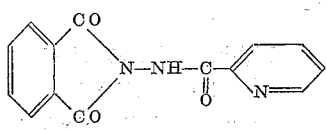

wherein R represents an ethylene or vinylene radical, or a fused aromatic ring substituent selected from the group consisting of benzene, chlorobenzene, hexahydrobenzene, tetrahydrobenzene, naphthalene, pyridine, and 3,6-methylene-4-cyclohexene.

It is believed that the invention may be best understood by reference to the following examples describing the preparation of specific compounds conforming to the general formula set forth above, as well as the pharmacological data obtained upon testing of a typical compound of the invention:

EXAMPLE I

Preparation of the phthalic hydrazide of α-pyridine carboxylic acid (Formula I):

α-Pyridine carboxylic acid hydrazide, in amount 34 grams, was dissolved in 200 milliliters of water at a temperature of 70° C. At this temperature, 37 grams of finely-divided, solid phthalic anhydride was added incrementally to the aqueous reaction mixture. The temperature rose slightly, and the desired α-pyridine carbonyl compound of the cyclic phthalic acid hydrazide was formed in nearly quantitative yield. The melting point for the compound after recrystallization from dimethylformamide-water is 218° C.

EXAMPLE II

Alternate synthesis for the preparation of the phthalic hydrazide of α-pyridine carboxylic acid:

α-Pyridine carboxylic acid hydrazide, in amount 137 grams, was dissolved in 200 milliliters of dimethylformamide at a temperature of 80° C. At this same temperature, a solution of 148 grams of phthalic anhydride in 400 milliliters of dimethylformamide was slowly run in. The temperature rose by a few degrees. The reaction mixture was stirred for a short time, and the desired end-product was then precipitated in the cold by means of water. The yield was 85.5%. (Melting point 218° C.)

The foregoing compound was selected for extensive pharmacological testing, and the data presented below represent the most significant results of these tests:

*Acute toxicity studies*

Groups of animals were treated with various dosage concentrations of the compound of Formula I, as administered by conventional routes, with the following results:

(A) RATS VIA ORAL SUSPENSION IN TRAGACANTH

| Dosage level (g./kg.) | Number of animals treated | Number of animals exhibiting toxic symptoms | Number of deaths |
|---|---|---|---|
| 5.0 | 3 | 0 | 0 |
| 10.0 | 13 | 0 | 0 |
| 15.0 | 5 | 0 | 0 |

(B) CATS VIA ORAL SUSPENSION IN TRAGACANTH

| | | | |
|---|---|---|---|
| 1.0 | 1 | 0 | 0 |
| 2.0 | 1 | 0 | 0 |

(C) MICE INTRAVENOUS INJECTION

| | | | |
|---|---|---|---|
| 0.01 [1] | 10 | 2 | 2 |
| 0.05 [1] | 10 | 0 | 0 |
| 0.1 [2] | 13 | 3 | 3 |
| 0.15 [1] | 13 | 3 | 1 |
| 0.20 [2] | 13 | 5 | 3 |
| 0.25 [2] | 10 | 2 | 1 |
| 0.30 [2] | 10 | 0 | 0 |
| 0.35 [2] | 10 | 10 | [3] 9 |
| 0.5 [2] | 10 | 10 | 10 |

[1] 0.1% dissolved in a sodium hydroxide solution.
[2] 1.0% dissolved in a sodium hydroxide solution.
[3] Spasms.

(D) RATS INTRAPERITONEAL INJECTION

| | | | |
|---|---|---|---|
| 0.5 | 3 | 0 | 0 |
| 1.0 | 3 | 0 | 0 |
| 3.0 | 3 | 3 | 3 |
| 5.0 | 3 | 3 | 3 |
| 10.0 | 3 | 3 | 3 |

(E) MOUSE SUBCUTANEOUS INJECTION

[Dissolved in a sodium hydroxide solution]

| | | | |
|---|---|---|---|
| 2 | 3 | 0 | 0 |

Chronical doses (A) *Cat.*—Two test animals were given dosage concentrations of 50 mg./kg. on 12 consecutive days. Both animals survived the total dosage and a subsequent observation period of 14 days. One of the animals lost weight during the test (from 3 kg. to 2.3 kg.) while the other maintained constant weight. No symptoms were found upon routine blood testing.

(B) *Rabbits.*—Three rabbits were repeatedly given doses of 50 mg. with an oesophageal sound. One of the animals died without symptoms after the fourth dose, and another after the ninth dose. Upon subsequent dissection no symptoms were found which could be connected with the treatment. The third animal survived a total of 12 doses and showed no toxic symptoms during a subsequent observation period of 14 days. It did not lose weight during the test, and the urine of the animal was normal throughout. The blood examination showed no symptoms.

Excretion studies

The resorption of the compound from the stomach and intestinal tract, as well as its excretion through the kidney was investigated. A dog was given 0.06 g./kg. corresponding to an absolute quantity of 0.612 grams. Another dog was given 0.5 g./kg. corresponding to 13.2 grams. The compound was detected by a modification of the method of Kelly and Poet. After 1 to 2 hours blood levels could be clearly determined in this manner. The compound was partially excreted through the urine (10 to 30%).

COMPATIBILITY TESTING—(INH AND THE COMPOUND OF FORMULA I).—ACUTE TESTS

| | Compound of Formula I, g./kg. | INH, g./kg. |
|---|---|---|
| Rat (oral sus.) | >15.0 | 0.6 |
| Cat (oral sus.) | >2.0 | 0.45 |
| Guinea pig (oral sus.) | | 0.15 |
| Mouse (i.v.) | 0.3–0.35 | 0.14 |
| Rat (i.p.) | 2.0 | |
| Mouse (sub.) | >2.0 | |

*Chemotherapeutical testing (in vitro).*—The phthalyl derivative of α-pyridine carboxylic acid hydrazide has an effectiveness against *Mycobacterium tuberculosis* in dilutions comparable to INH. The strains of *Mycobacterium tuberculosis* were inhibited on egg-media culture by dilutions of 1:50,000,000 and 1:100,000,000. The compound is as little active against INH-resistant strains as is INH itself.

*Chemotherapeutic testing (in vivo).*—The compound was first administered to humans in the same dosage concentrations found effective for INH, i.e., 5 to 8 mg. for adults. Since the compatibility of the compound in animal tests was substantially better than that of INH, an increase of the dosage concentrations was attempted, to the extent that side effects were not observed. Significantly, the compound was tolerated in high doses for prolonged periods. In fact, it was possible to increase the dosage concentration to double that of the general average daily doses without undesirable side effects. The compound was packaged for administration in bottles of 100 tablets of 0.1 gram. Its effectiveness against *Mycobacterium tuberculosis* within human hosts is found to be equivalent to that of INH.

The general procedure of Example II was repeated for the preparation of the condensates of α-pyridine carboxylic acid hydrazide with each of the following dicarboxylic acid anhydrides:

EXAMPLE III

*4-chlorophthalic anhydride*

(III) 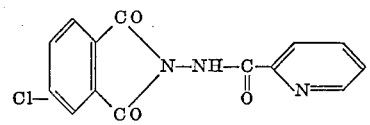

(Melting point=174° C.)

EXAMPLE IV

*Hexahydrophthalic anhydride*

(IV) 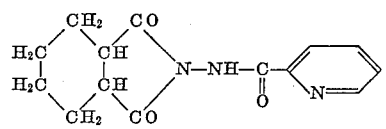

(Melting point=145° C.)

EXAMPLE V

*3,6-endomethylene-Δ⁴-tetrahydrophthalic anhydride*

(V) 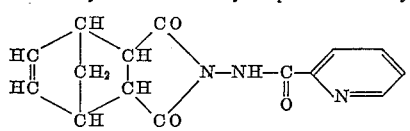

( Melting point=131° C.)

EXAMPLE VI

*Maleic anhydride*

(VI) 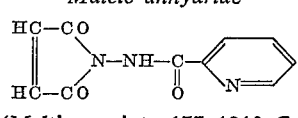

(Melting point=177–181° C.)

The compounds of Examples III–VI were tested for in vitro activity against *Mycobacterium tuberculosis* (strain H37), and the following respective results were obtained:

| Compound: | In vitro activity |
|---|---|
| Example III | 1:50 mill.–1:100 mill. |
| Example IV | 1:1 million. |
| Example V | 1:25,000–1:100,000. |
| Example VI | 1:100,000–1:1 mill. |

This application constitutes a continuation-in-part of our copending U.S. application Serial No. 611,363, entitled, "Chemical Compounds and Process for Producing the Same," which was filed on September 21, 1956, and has since been abandoned.

Having thus described the subject matter of our invention, what it is desired to secure by Letters Patent is:

1. A chemical compound represented by the formula:

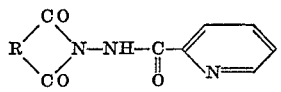

wherein R is a member selected from the group consisting of ethylene; vinylene; phenylene; monochlorophenylene; cyclohexylene; tetrahydrophenylene; naphthylene; 2,3-pyridylene and 3,6-methylene-4-cyclohexylene radicals.

2. The chemical compound represented by the formula:

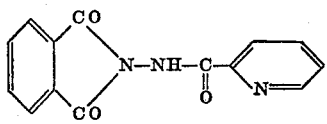

3. The chemical compound represented by the formula:

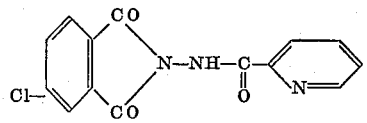

4. The chemical compound represented by the formula:

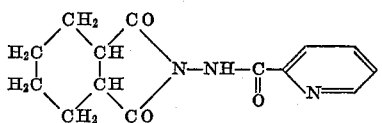

5. The chemical compound represented by the formula:

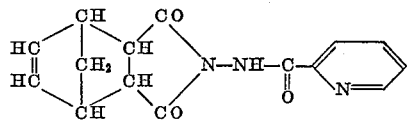

6. The chemical compound represented by the formula:

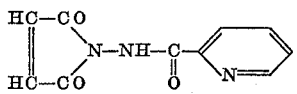

No references cited.